United States Patent [19]

Koyano et al.

[11] 4,071,849
[45] Jan. 31, 1978

[54] SYSTEM FOR PRINTING IMAGES HAVING A HALF TONE

[75] Inventors: Hitoshi Koyano; Nobuo Sugaya; Michio Shiraogawa, all of Tokyo, Japan

[73] Assignee: Oki Electric Industry Co., Ltd., Tokyo, Japan

[21] Appl. No.: 677,964

[22] Filed: Apr. 19, 1976

[30] Foreign Application Priority Data

Apr. 22, 1975  Japan ................................ 50-48126

[51] Int. Cl.² .......................................... G01D 15/10
[52] U.S. Cl. .................................... 346/1; 346/76 R; 358/298
[58] Field of Search .................. 346/76 R, 75, 1, 35; 358/298, 299, 296

[56] References Cited

U.S. PATENT DOCUMENTS 3,987,492  10/1976  Kraus et al. ......................... 346/75

Primary Examiner—Joseph W. Hartary
Attorney, Agent, or Firm—Kenyon & Kenyon

[57] ABSTRACT

Printed images having a half tone are realized in a printing system using a temperature sensitive paper. A thermal-head which is positioned close to the temperature sensitive paper is heated by an input electrical signal and the heated thermal-head changes the darkness of the temperature sensitive paper. The period of time that the thermal-head is heated is controlled by the input electrical signal and, thus, the temperature of the thermal-head is a function of the input electrical signal. The darkness or the concentration of images on the temperature sensitive paper can be changed according to the input electrical signal. Thus an image having a half tone is obtained on a temperature sensitive paper.

7 Claims, 5 Drawing Figures

SYSTEM FOR PRINTING IMAGES HAVING A HALF TONE

BACKGROUND OF THE INVENTION

This invention relates to a system for printing images having a plurality of gradation levels, which, in the case where printed images, such as pictures, letters, and characters, are reproduced by using picture element reproduction elements, permits the reproduction of intermediate gradation levels or half tones of the printed images.

In order to reproduce or print images such as pictures, letters, and characters from input information, a method has been proposed. In accordance with the proposed method input images are divided into a number of very small cells (called picture elements hereinbelow) arranged in matrix form and each of the printed images is obtained as a whole by using picture element reproduction elements, one each of which being disposed so as to correspond to a different picture element. In general, according to this method, in most cases, logic circuits such as digital integrated circuits are used in electric circuits driving picture element reproduction elements. Such a reproduction system has a drawback that, since each picture element reproduction element can give only two value information, i.e. ON or OFF, corresponding to the presence or absence of an information signal, it can express only a black and white picture element. Therefore, printed images having a half tone or a plurality of gradation levels cannot be reproduced. In such a case, if a picture element were further divided into still smaller elements and considered as an assembly of the still smaller elements in a certain area, gradation display of printed images would be possible by this prior method. However, this prior method has other disadvantages in that the distinctness or resolving power for the printed images is degraded, that a picture element reproduction system should be constituted extremely finely, and that the structure of its hardwares are complicated.

SUMMARY OF THE INVENTION

The object of this invention is, therefore, to remove these disadvantages of prior image reproduction technics and to provide a method for printing images having a plurality of gradation levels so as to permit the reproduction of intermediate gradation levels of printed images by using picture element information in a form of coded data for the reproduction of printed images such as pictures, letters, and characters by means of picture element reproduction elements.

In order to achieve the above object, the method for printing images having a plurality of gradation levels according to this invention is characterized in that input image information representing gradation levels of each picture element in binary expression is memorized in a buffer memory; that information on drive time corresponding to each picture element information is obtained through a selection gate circuit from an output of said buffer memory and an output of a circuit controlling the drive time of picture element reproduction elements; that the output of said selection gate circuit is memorized in memory elements corresponding one by one to said picture element reproduction elements; that said picture element reproduction elements are driven by an output of said memory elements, and; that printed images having a plurality of gradation levels are reproduced by time sharing control of the drive time of said picture element reproduction elements.

BRIEF DESCRIPTION OF THE DRAWINGS

The foregoing and other objects, features, and attendant advantages of the invention will be appreciated as the same become better understood by means of the following description and the accompanying drawings wherein.

DESCRIPTION OF THE PREFERRED EMBODIMENTS

Figure 1:
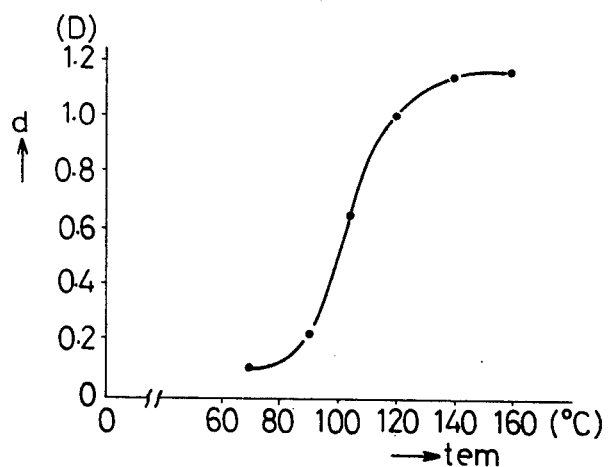
FIG. 1 shows a characteristic curve representing the relationship between heating temperature and coloring gradation levels.

In a thermal-head printer, a plurality of thermal-heads of a pin-point shape are arranged close to the temperature sensitive paper. Said thermal-head is heated by an input elelctrical signal which indicates the desired pattern of printed images. The darkness or the concentration of said temperature sensitive paper is changed by the heated thermal-head and, thus, a pattern or image corresponding to the input electrical signal is printed on a paper. The concentration of the gradation level of the temperature sensitive paper is proportional to the heating temperature and the relationship between them varies depending upon characteristics of the temperature sensitive paper. FIG. 1 (according to NIKKEI Electronics No. 91) shows one example of this relationship, in which the ordinate and the abscissa represent the coloring gradation level $d$ and the heating temperature tem, respectively. The heating temperature is determined by heat generated by the heating element and heat evacuated by the temperature sensitive paper. Consequently, it is possible to control the coloring gradation level of the temperature sensitive paper by controlling the heat generated by the heating element. Further, the heat generated by the heating element is proportional to a product of the voltage applied to the heating element and its drive time, because it is generated by Joule effect. Taking this fact into account, according to this invention, heat generation is regulated by the time sharing control of the drive time of the picture element reproduction element in order to reproduce printed images having a plurality of gradation levels by giving different gradation levels to reproduced picture elements. This invention will now be described in more detail with reference to the drawings.

Figure 2:
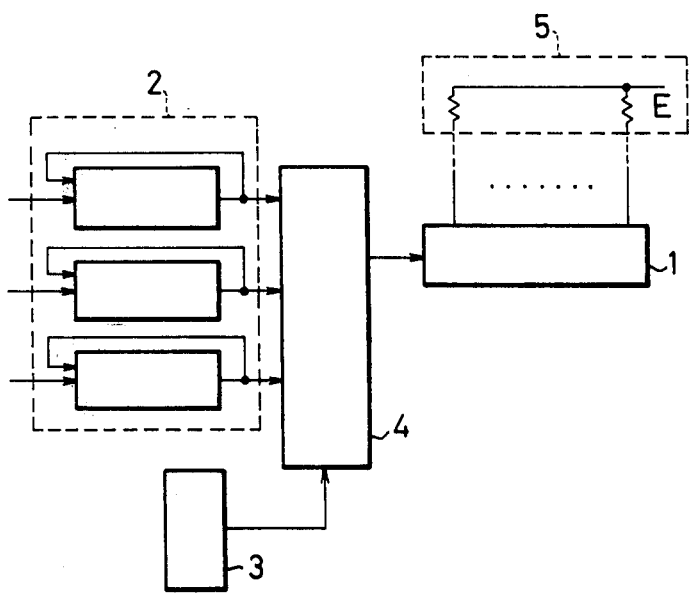
FIG. 2 is a block diagram representing an embodiment of the method for memorizing images having a plurality of gradation levels according to this invention.

FIG. 2 shows a block diagram of an embodiment of this invention, in which the reference numeral 1 denotes a memory element connected one by one to picture element reproduction elements 5, 2 is a buffer memory memorizing picture element information expressed by 3 bits, 3 is a circuit controlling the drive time of the picture element reproduction elements 5, 4 is a selection gate circuit sending ON or OFF signals to the memory element 1, depending upon the content of one picture element in the buffer memory and that in the circuit 3 controlling the drive time, and 5 is picture element reproduction elements arranged on a linear line of a paper. There are, of course, some circuits, such as a driver circuit for an adapting interface inserted between the memory element 1 and the picture element reproduction elements 5, which are omitted in FIG. 2 because they are not parts of this invention. Further, in this embodiment, the picture element reproduction elements are arranged contiguously to each other on one line and each picture element has eight gradation levels. Consequently, one picture element is controlled by binary code signals of 3 bits.

Figure 3:
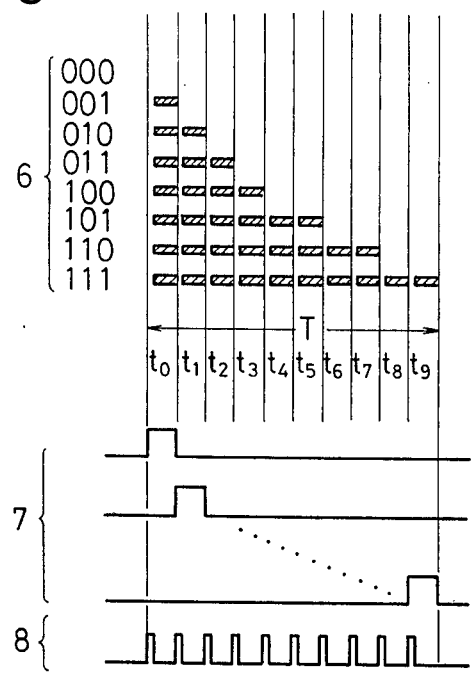
FIG. 3 is a time chart for explanation of the operations of the device indicated in FIG. 2.

Operations of the reproduction system according to this embodiment will be explained referring to FIG. 3. FIG. 3 is a time chart showing the operations of this embodiment, in which the reference numeral 6 represents the operation of the buffer memory 2, 7 shows pulses from the circuit controlling the drive time 3 and 8 shows the shift duration necessary for shifting information from the buffer memory 2 to the memory element 1. In FIg. 3 T is the total time for driving the picture element reproduction elements 5 and in this embodiment it is divided into 10 control time intervals $t_0-t_9$, by the pulses produced by the circuit controlling the drive time 3, during which the picture element reproduction elements are driven. In this case the drive time is divided into 10 control time intervals, while the number of gradation levels is 8. That is, there are 10 control time intervals for eight gradation levels, in order to effect corrections, which are necessary because of the non-linear relationship between the drive time of the picture element reproduction elements and the coloring gradation levels.

Suppose now that picture element information for one line is stored in the buffer memory 2 by 3 bits per each picture element. As indicated by 6 in FIG. 3, during the first time interval $t_0$, when 3 bit picture element information is 000, the information indicating no signal is sent, and otherwise ON signals, are shifted at high speed through the selection gate circuit 4 to the memory element 1. The time necessary for this shift in indicated by 8 in FIG. 3. The memory element 1 is operated so that a picture element reproduction element 5 is driven by the signals ON and is not driven by the signals OFF. This operation is finished in the time interval $t_0$. When the shifting of information for one line is finished, the buffer memory returns to the initial state before the shifting of information. During the next time interval $t_1$ similar operations are carried out except that OFF signals in case where the picture element information in the buffer memory is 000-001 and otherwise ON signals, are shifted to the memory element 1 so that the picture element reproduction elements are driven according to the signals. During the following time intervals $t_2-t_9$ analogous operations are carried out. The above described operations mean that a picture element reproduction element is not driven during the time intervals $t_0 t_9$, if the 3 bit picture element information in the buffer memory 2 is 000, that the reproduction element is driven only during the time interval $t_0$ if the information is 001, that the reproduction element is driven during the time intervals $t_0$ and $t_1$ if the information is 010, and that the reproduction element is driven analogously if the information is 011-111. Therefore, picture elements for one line are expressed with different gradation levels corresponding to the durations of the drive time. The time required for the shifting indicated by 8 in FIG. 3 is very short with respect to the duration of each of $t_0-t_9$ and, hence, can be neglected.

When the time control of $t_0-t_9$ is finished, picture element information for the next line is stored in the buffer memory 2 and the same operations as described above are carried out. A whole printed image is thus reproduced by repeating these operations.

Figure 4:
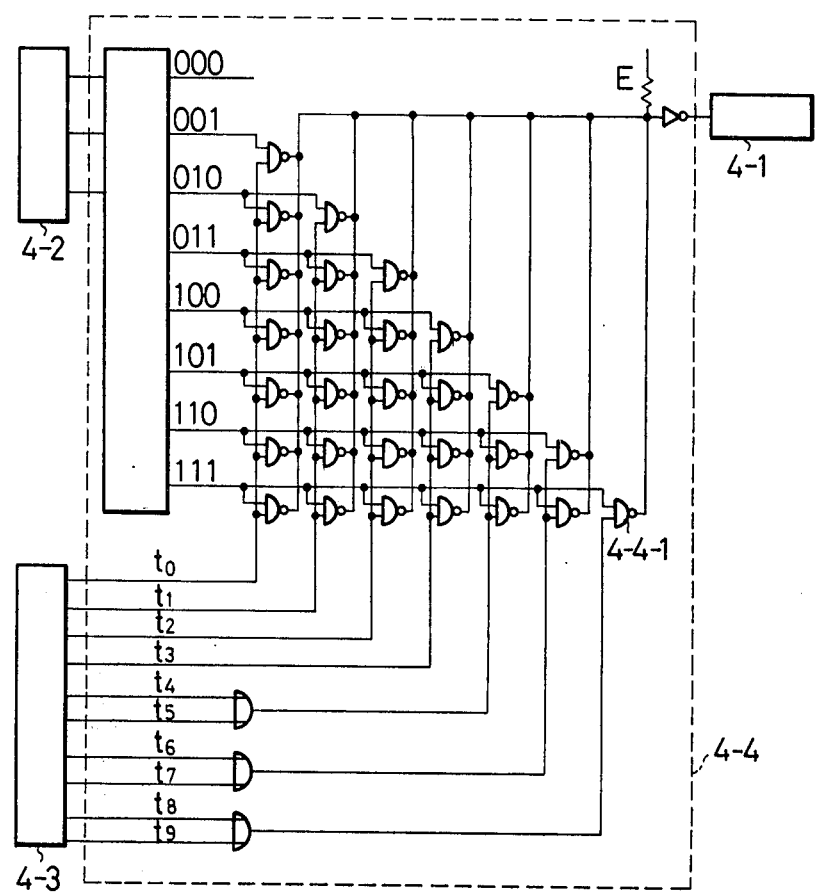
FIG. 4 is a circuit diagram showing an example of the selection gate circuit indicated in FIG. 3.

The selection gate circuit 4 chooses and shifts information, whether the picture element reproduction elements 5 should be driven or not, depending upon indications from the circuit controlling the drive time 3 and the 3 bit picture element information in the buffer memory 2 to the memory element 1. An example of the selection gate circuit is illustrated in FIG. 4, in which the reference numeral 4-1 is a memory element 1, 4-2 is a buffer memory 2, 4-3 is a circuit controlling the drive time 3, 4-4 indicates details of the selection gate circuit 4 and 4-4-1 represents a NAND gate consisting of an open collector. As indicated clearly in this figure, during the time interval $t_0$, in the case where picture element information differs from 000, a signal is shifted to the memory element 4-1. During the following time intervals $t_1-t_9$ the same operations as described previously referring to FIG. 3 are carried out.

Further, it is possible to simplify the circuit by using a digital comparator (for example, SN5484 of Texas Instruments Inc. and so forth) for the selection gate circuit 4-4.

Figure 5:
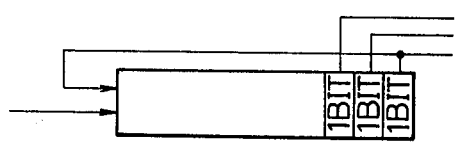
FIG. 5 is a circuit diagram showing another example of the buffer memory indicated in FIG. 2.

In addition, although the invention has been explained referring to a figure in which the buffer memory 2 consists of 3 bit elements and a shift register is disposed for each bit, it is clear that a shift register having a same capacity is sufficient. In this case the buffer memory 2 is constituted as indicated in FIG. 5.

As described above, the method for printing images having a plurality of gradation levels according to this invention is advantageous not only because printed images having a plurality of gradation levels are easily produced, as the drive time of the picture element reproduction elements is regulated by the time sharing control and almost all the operations are effected under series controls, but also because integrated circuits which have a high density and are available in the market can be utilized. Furthermore, this method has another advantage in that a device for it can be constructed in a compact form, because its hardwares can be simplified.

Although, in the above description, the method for printing images having a plurality of gradation levels has been explained for the case where heating elements are used as picture element reproduction elements, it should be understood that any picture element reproduction elements changing gradation levels or dimensions of picture elements by controlling the electric power applied to the picture element reproduction elements can be used without departing from the scope of this invention.

From the foregoing it will now be apparent that a new and improved system for printing images having a half tone has been found. It should be understood of course that the embodiment disclosed is merely illustrative and is not intended to limit the scope of the invention. Reference should be made to the appended claims, therefore, rathar than the specification for indicating the scope of the invention.

What is claimed is:

1. A method for printing images on a line by line basis, said images on each line having a plurality of gradation levels, characterized in that input image information representing the gradation levels of each picture element on a line in binary expression is memorized in a buffer memory; that information on drive time corresponding to each picture element information on said line is obtained through a selection gate circuit from an output of said buffer memory and an output of a circuit controlling the drive time of picture element reproduction elements arranged along said line and having a drive time T for producing the images on said line; that the output drive information of said selection gate circuit is memorized in memory elements corresponding one by one to said picture element reproduction elements; that those picture element reproduction elements whose memory elements memorized drive information indicating an ON drive condition are substantially simultaneously driven by their respective memory elements; whereby printed images having a plurality of gradation levels are reproduced on said line by time sharing control of the drive time of said picture element reproduction elements.

2. The invention as defined in claim 1, wherein the number of the gradation levels is expressed in three bits.

3. The invention as defined in claim 1, wherein said drive time is selected from ten control time intervals.

4. A method in accordance with claim 1 wherein:
said drive time is substantially equal to the time corresponding to the time required to realize the maximum gradation level.

5. A method in accordance with claim 4 wherein:
the driving of each of said picture element reproduction elements occurs over a portion of said drive time T corresponding to the gradation level associated with that picture element reproduction element.

6. A printer for printing images having a plurality of gradation levels comprising a plurality of picture element reproduction elements (5) arranged on a linear line of a paper to produce images on such line in the drive time T allotted to such elements for producing said image line, a plurality of memory elements (1) each being connected to the corresponding picture element reproduction element, a buffer memory (3) for memorizing picture element information representing the gradation levels of each picture element in binary expression, a selection gate circuit (4) for sending signals to the memory element (1) depending upon the content of the buffer memory, a circuit (3) for controlling the operation of said selection gate circuit, and said selection gate circuit (4) and said circuit (3) functioning to provide signals to said memory elements (1) such that said memory elements store drive information for said picture elements and such that said memory elements which store drive information indicating an ON drive condition act substantially simultaneously to drive their respective reproduction elements, thereby causing time sharing control of said drive time of said elements.

7. A printer in accordance with claim 6 wherein:
said paper is temperature sensitive;
and each of said picture element reproduction elements comprises a thermal head whose temperature is a function of the level and duration of the signal from the corresponding memory element.

* * * * *